United States Patent
Narvaez et al.

(10) Patent No.: US 7,944,829 B2
(45) Date of Patent: May 17, 2011

(54) MECHANISM FOR MANAGING ACCESS TO RESOURCES IN A HETEROGENEOUS DATA REDIRECTION DEVICE

(75) Inventors: Paolo Narvaez, Sunnyvale, CA (US); Murat Bog, Fremont, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 1247 days.

(21) Appl. No.: 11/093,184

(22) Filed: Mar. 28, 2005

(65) Prior Publication Data

US 2006/0215551 A1   Sep. 28, 2006

(51) Int. Cl.
*G08C 15/00* (2006.01)

(52) U.S. Cl. ............... 370/230.1; 370/235; 370/429

(58) Field of Classification Search ........... 370/229, 370/230, 230.1, 235, 235.1, 412, 428, 429, 370/395.4, 395.41, 465; 713/503; 718/102–105; 709/226, 228, 235; 710/52–56
See application file for complete search history.

(56) References Cited

U.S. PATENT DOCUMENTS

| | | | |
|---|---|---|---|
| 6,408,005 B1 | 6/2002 | Fan et al. | |
| 6,556,578 B1* | 4/2003 | Silberschatz et al. | 370/412 |
| 6,671,258 B1* | 12/2003 | Bonneau | 370/235 |
| 6,788,697 B1 | 9/2004 | Aweya et al. | |
| 6,898,182 B1 | 5/2005 | Cloonan | |
| 6,901,593 B2 | 5/2005 | Aweya et al. | |
| 6,999,997 B2* | 2/2006 | Clarke et al. | 709/213 |
| 7,245,586 B2* | 7/2007 | Bitar et al. | 370/235 |
| 7,286,550 B2* | 10/2007 | Modali et al. | 370/412 |
| 7,369,500 B1* | 5/2008 | Gallagher et al. | 370/235 |
| 2002/0009051 A1 | 1/2002 | Cloonan | |
| 2003/0058793 A1* | 3/2003 | Rochon et al. | 370/229 |
| 2004/0042477 A1* | 3/2004 | Bitar et al. | 370/412 |
| 2005/0195740 A1* | 9/2005 | Kwon | 370/229 |
| 2005/0276221 A1* | 12/2005 | Olesinski et al. | 370/235 |
| 2006/0013128 A1* | 1/2006 | Connor et al. | 370/229 |
| 2006/0045111 A1* | 3/2006 | Sinha et al. | 370/412 |
| 2006/0062233 A1* | 3/2006 | Brewer et al. | 370/412 |

FOREIGN PATENT DOCUMENTS

| | | |
|---|---|---|
| EP | 0901301 A2 | 10/1999 |
| EP | 1932284 | 6/2008 |
| WO | WO 2006/104804 | 10/2006 |

OTHER PUBLICATIONS

Supplementary European Search Report dated Jul. 30, 2009 for EP Application No. 06748548.2.
Written Opinion of the International Searching Authority dated Jun. 25, 2007 for PCT Application No. PCT/US2006/010401.

* cited by examiner

*Primary Examiner* — Ian N Moore
(74) *Attorney, Agent, or Firm* — Vista IP Law Group, LLP

(57) ABSTRACT

A system and method for policing of access to resources in a heterogeneous data redirection device is disclosed. The invention utilizes Random Early Detection to determine whether or not a given packet should be dropped or accepted into the resource. The invention uses a combination of different metrics each of which utilizes a different version of RED. Schemes can include a Per-Flow Weighted RED metric, a Global RED metric and a Fair Share Pool metric, where shared resource allocation is dependent dynamically upon the number of users at the time a packet requests access. These metrics can be combined in variety of ways to yield a final drop or accept decision for an incoming packet so that it does not access resources.

30 Claims, 9 Drawing Sheets

| $B_R$ | 19 bit unsigned integer |
|---|---|
| $W_S$ | 0.8 unsigned fixed-point |
| Configuration for UFID 1 | |
| ⋮ | |
| Configuration for UFID 2047 | |

| $B_R$ | 19 bit unsigned integer |
|---|---|
| $W_S$ | 0.8 unsigned fixed-point |
| Configuration for MFID 1 | |
| ⋮ | |
| Configuration for MFID 539 | |

| Effective Shared Buffer Occupancy Threshold (19 bit unsigned integer) | Packet Drop Probability (0.8 unsigned fixed-point) |
|---|---|
| $ESBT_0$ | $P_0$ |
| $ESBT_1$ | $P_1$ |
| $ESBT_2$ | $P_2$ |
| $ESBT_3$ | $P_3$ |
| $ESBT_4$ | $P_4$ |
| $ESBT_5$ | $P_5$ |

FIG. 8

| Total Instantaneous Buffer Occupancy Threshold (19 bit unsigned integer) | Packet Drop Probability (0.8 unsigned fixed-point) |
|---|---|
| $TBT_0$ | $P_0$ |
| $TBT_1$ | $P_1$ |
| $TBT_2$ | $P_2$ |
| $TBT_3$ | $P_3$ |
| $TBT_4$ | $P_4$ |
| $TBT_5$ | $P_5$ |

FIG. 9

MECHANISM FOR MANAGING ACCESS TO RESOURCES IN A HETEROGENEOUS DATA REDIRECTION DEVICE

BACKGROUND OF THE INVENTION

Certain network devices may be classified as heterogeneous in that they may accept data of many different types and forward such data (for egress) in many different formats or over different types of transmission mechanisms. Examples of such devices include translating gateways which unpackage data in one format and repackage it in yet another format. When such devices merely forward data from point to point, there is little need to classify packets that arrive at such devices. However, in devices where there are multiple types of ports which may act as both ingress and egress ports, and further in devices where physical ports may be sectioned into many logical ports, there is a need for packet classification. In some of these devices, where the devices also provision multicasting of data, packets must often be stored in queues or memories so that they can be read in turn by all of the multicast members (e.g. ports) for which they are destined.

FIG. 1 illustrates a heterogeneous network environment which provides different types of services and marries different transport mechanisms. A network ring 100 may include a high capacity network such as a SONET ring and usually provides service to more than one customer. Such customers may distribute the service they receive to one or more nodes behind their own internal network. FIG. 1 shows nodes 110, 120, 130, 140, 150 and 160. Nodes 140 and 150 are accessed via the same Customer Premises Equipment (CPE) network device 180 while the other nodes are shown directly accessing the ring 100. CPE 180 may be a gateway which apportions transport mechanisms such as Ethernet or PDH (such as a T1 or T3 line) over the ring 100 making use of the bandwidth given thereby. As mentioned above, ring 100 is a carrier-class network which may have a very large bandwidth such as 2.5 Gb/s. As such, ring 100 is not like a typical Local Area Network or even a point-to-point leased line.

While network elements could simply be built with many different physical line cards and large memories, such cost may be prohibitive to a customer. Further, where the customer seeks to utilize many different channels or logical ports over the same physical ingress or egress port, such solutions do not scale very well and increase the cost and complexity of the CPE dramatically. Recently, there are efforts underway to provide scalable network elements that can operate on less hardware and thus, with less cost and complexity than their predecessors but still provide better performance. In such efforts, policing access to and the allocating of physical resources of the network elements (e.g., buffer memory and processing cycles) are vital. Buffers can either be shared by different flows/ports or dedicated or some combination of the two. Buffers may also be implemented in internal or external memory depending upon system design and cost constraints. Buffers whether shared or dedicated may become full or be overutilized by a particular service, port or flow.

In such cases, a mechanism is needed to determine when such resources are exhausted and when packets can be dropped by the network element in order to properly allocate available buffer space to other flows, ports and services, as desired. Although some mechanisms have been implemented to manage buffer usage, these mechanisms are constrained by configuration and often cannot adapt to changing traffic profiles.

SUMMARY

What is disclosed is a system and method for policing of resources in network devices including network devices that act to bridge heterogeneous networks, provide many different services and provision many different transport mechanisms. Different dropped packet mechanisms that are the subject of various embodiments of the invention "drop" packets—by discarding the packets and ceasing further processing of the packets—such that the packets do not occupy buffer or other resources within a network device. Since many different flows are possible within the network device, the dropped packet mechanisms must enforce a usage policy that can allocate resources to current flows and to accommodate packets of flows which are yet to arrive. Rather than allocate buffers in a predetermined way, the system can allow for dynamic sharing of resources based on flow and usage metrics.

In accordance with various embodiments of the invention, the dropped packet mechanisms can use one or more different schemes for buffer management. Combinations of these schemes provide a Random Early Detection (RED) decision as to whether or not to drop an incoming packet. A first one of these schemes is a Flow Based mechanism where, broadly speaking, the probability that a given incoming packet of that flow should be dropped increases as an associated flow's buffer occupancy increases. A second scheme is a Total Buffer scheme, where packets are then dropped if the total buffer space is close to being occupied, regardless of the flow to which they belong. A third scheme is a Shared Occupancy mechanism where buffer space (in fair share proportion) allocated to each user (flow or port) decreases as the total number of users increases.

In some embodiments of the invention, all three of these schemes can be applied in conjunction with one another in making a decision whether or not to drop a packet. If any of the three schemes yield a decision that the packet is to be dropped, then the packet is dropped.

BRIEF DESCRIPTION OF THE DRAWINGS

These and other objects, features and advantages of the present invention are better understood by reading the following detailed description, taken in conjunction with the accompanying drawings, in which:

FIG. 8 shows a RED curve for the GFSP-WRED mechanism being specified with a set of effective shared buffer occupancy thresholds and corresponding packet drop probabilities; and FIG. 9 shows an example in which the RED curve for G-RED implementation is specified with a set of total instantaneous buffer occupancy thresholds and corresponding drop probabilities.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Embodiments of the invention provide systems and methods for policing resources in network devices including devices that, for example, act as a switch to bridge heterogeneous networks, to provide many different services and to provision many different transport mechanisms. A dropped packet mechanism, which is the subject of various embodiments of the invention, "drops" packets by discarding them and ceasing further processing of them such that the dropped packets need not occupy buffer or other resources within the device. Since many different flows are possible within the network device, the dropped packet mechanism must typically enforce a usage policy that can allocate the resources not only to current flows but to accommodate packets of flows which are yet to arrive. Rather than allocate buffers in a predetermined way, various embodiments provide systems that allow for dynamic sharing of resources based on flows and usage metrics.

A packet dropping engine, in accordance with various embodiments of the invention, can use one or more different mechanisms for buffer management. These mechanisms taken together provide Random Early Detection (RED) decisions for determining whether or not to drop an incoming packet. A first one of these mechanisms is a Per-Flow Weighted RED mechanism where, broadly speaking, the probability that a given incoming packet of that flow should be dropped increases as an associated flow's buffer occupancy increases. A second mechanism is a Global RED mechanism, where packets are then dropped if the total buffer space is close to being occupied, regardless of the flow to which they belong. A third mechanism is a Fair Share Pooled mechanism where probability of acceptance into a shared pool decreases as the total number of users (flows or ports) increases.

Figure 3:
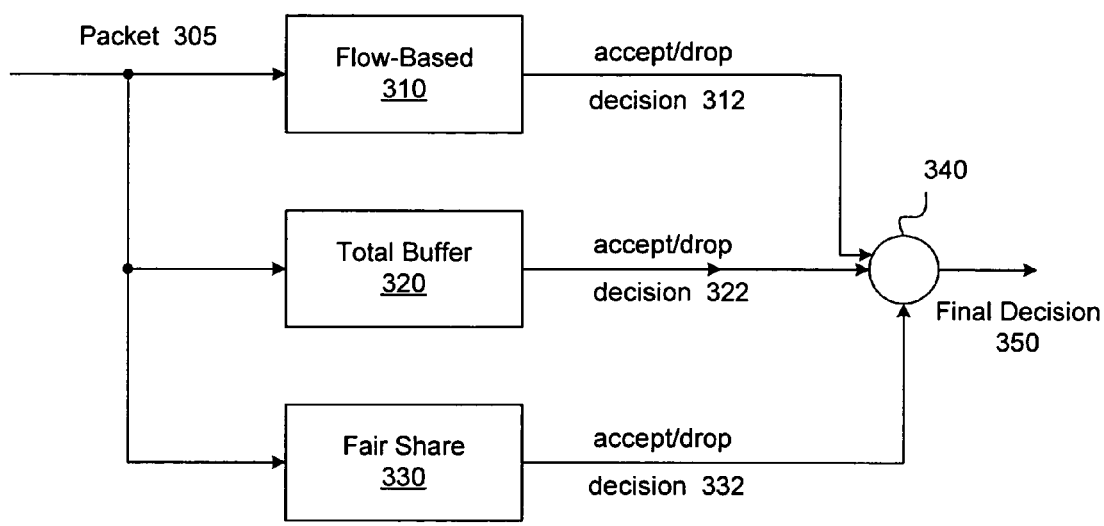
FIG. 3 illustrates an accept/drop packet decision system in accordance with at least one embodiment of the invention.

In some embodiments of the invention, all three of these mechanisms are applied in conjunction with one another in deciding whether or not to drop a packet. Decision logic (such as an AND gate or more complex logic) can be used to determine what combinations of drop decisions obtained from these mechanisms yield a final decision to drop and one or more of these mechanisms can operate in parallel to arrive at an accept packet or drop packet decision. These mechanisms can be employed independent of one another or in combination as shown in FIG. 3.

Figure 1:
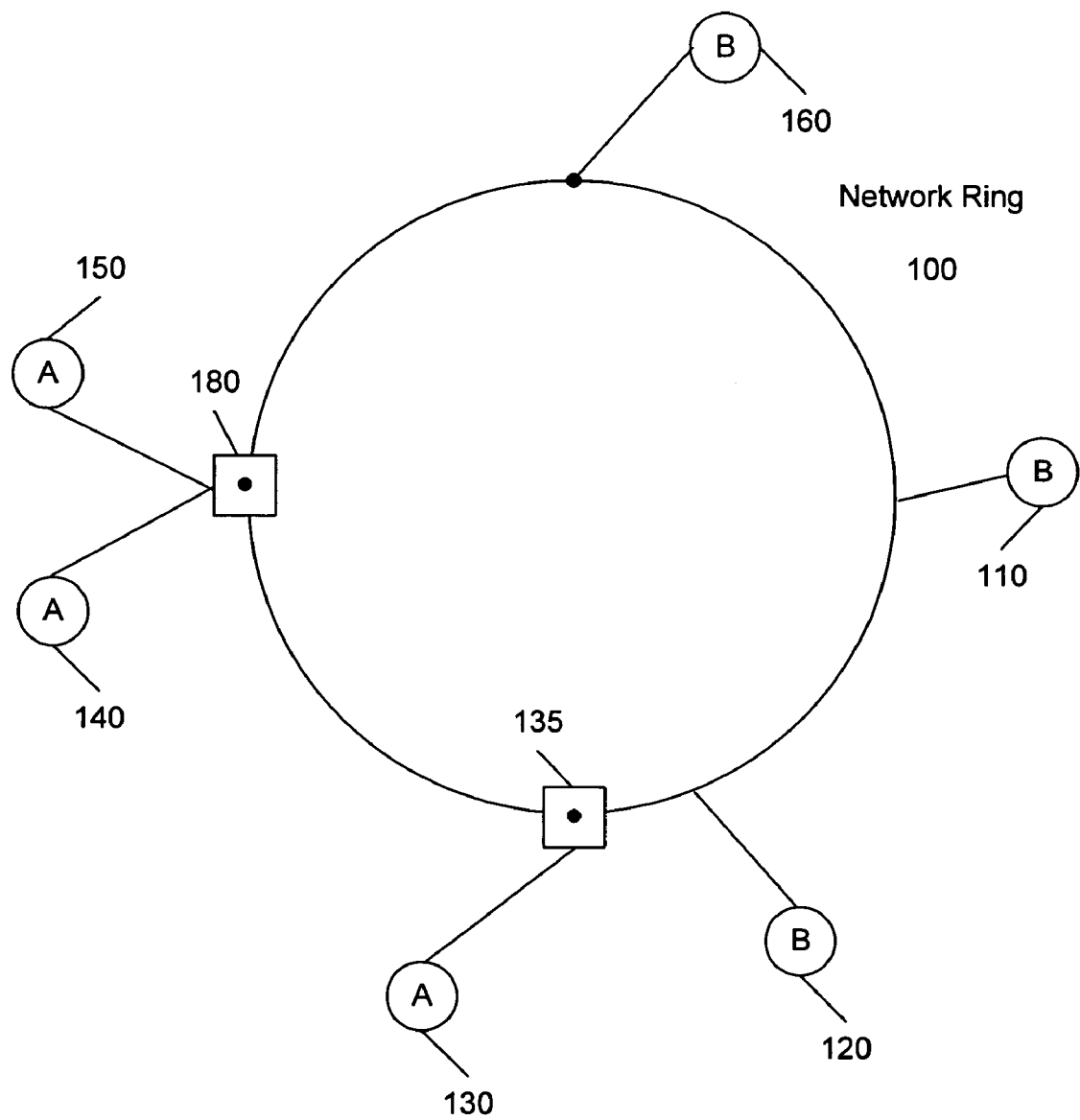
FIG. 1 illustrates a heterogeneous network environment which provides different types of services and marries different transport mechanisms.
Figure 2:
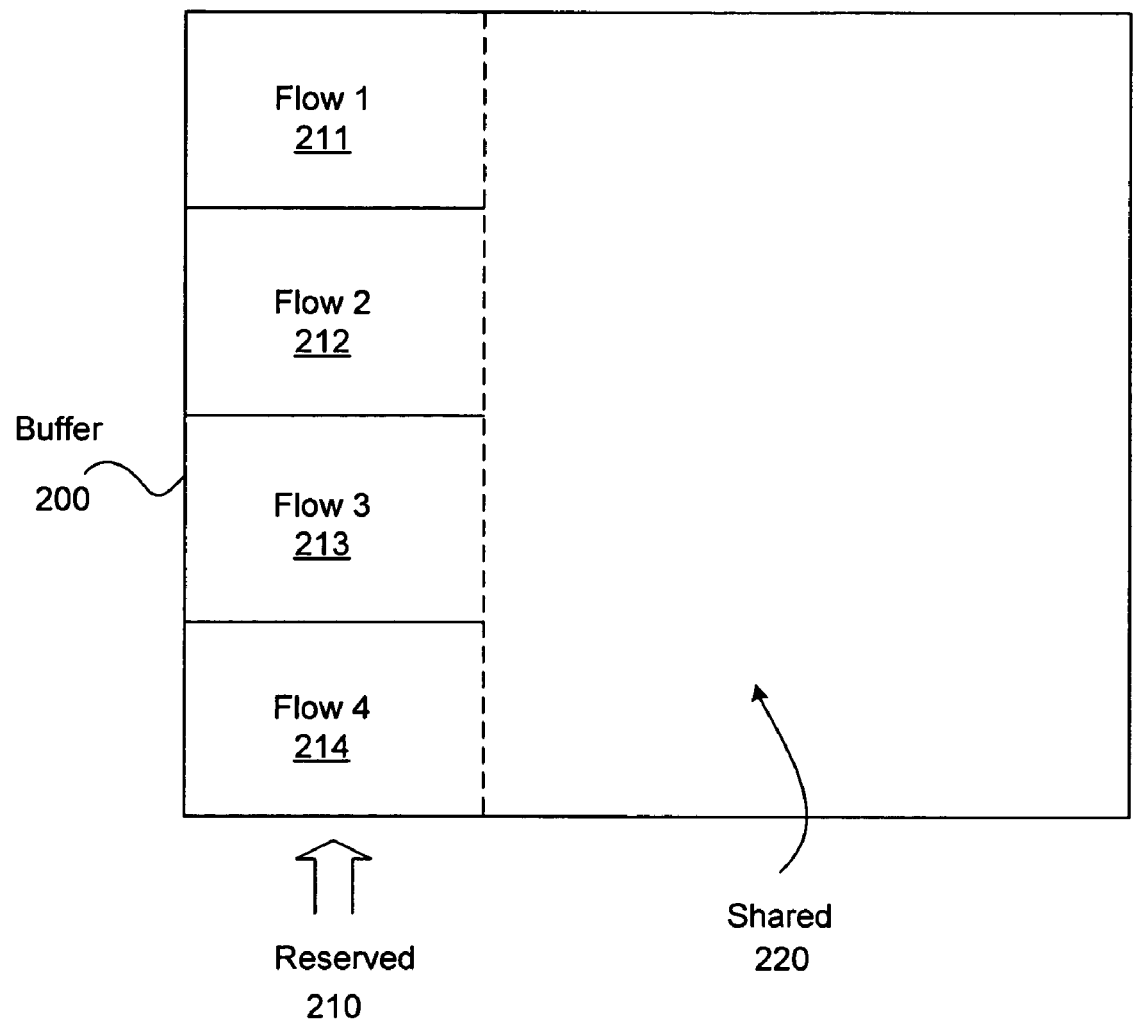
FIG. 2 illustrates a buffer which provides a shared storage for a plurality of packet flows through a device in a heterogeneous network environment.

FIG. 2 provides an example of a buffer which provides a shared storage for a plurality of packet flows through a device in a heterogeneous network environment. Buffer 200 has both a reserved area 210 and a shared area 220. The reserved area 210 is typically used to reserve space for a plurality of flows and may be used to provide space for flows for which service is guaranteed. Buffer 200 shows four reserved blocks of buffer space 211, 212, 213, and 214, for flows labeled Flow 1, Flow 2, Flow 3, and Flow 4, respectively. The shared area 220 is typically used for any flows for which service is not guaranteed and as overflow space for extra memory needed when reserved space for flows has been fully occupied. For instance, if the reserved block 211 for packets belonging to Flow 1 is full or close to being full then, upon acceptance, future incoming packets belonging to Flow 1 will be stored into the shared area 220.

In accordance with various embodiments of the invention, access to shared area 220 is limited and controlled by a drop packet decision engine, which decides if a given incoming packet needing access is to be dropped or accepted. Thus, referring to the above example of packets for Flow 1, if reserved area 211 is becoming more full, then a decision on whether or not to drop future incoming packets belonging to Flow 1 is made. This decision can be based on a number of different RED mechanisms operating alone or in combination with one another. A RED "profile" or a group of RED profiles based on packet priority can be applied for each mechanism to a flow or group of flows or ports. The profile or group of profiles may help in determining a probability weighting for a packet being dropped or accepted based on current buffer conditions. RED typically uses a measure—hereinafter referred to generally as "buffer occupancy"—as a parameter to a random function that decides whether congestion avoidance mechanisms ought to be triggered. Probability of a packet-drop decision typically increases as the average occupancy increases. For the purposes of discussion, a RED profile curve indicates a curve that plots the buffer occupancy against the drop probability. RED curves are shown and described below with respect to the different mechanisms applied in making a packet drop decision.

While each mechanism typically has an associated set of conditions, according to RED, the probability that a packet will be dropped typically increases with buffer occupancy. Further, as described below, the definition of "buffer occupancy" may vary based on the RED mechanism. In accordance with one embodiment of the invention, three different mechanisms are applied conjunctively in making a decision whether or not to drop a packet. Each of these mechanisms has its own RED profile or series of RED profiles, as discussed below. The first of these mechanisms is a Flow Based mechanism where, taken on its own, the probability that a given incoming packet of a flow should be dropped increases as the flow's reserved block (e.g. reserved area 211 for Flow 1) occupancy increases. The second is a Global RED mechanism in which packets are dropped if the total buffer (e.g. buffer 200) space, shared and reserved, is close to being occupied regardless of the flow to which they belong. The third is a Global Fair Share Pool Weighted RED mechanism wherein the fair share of the shared area (e.g. shared area 220) allocated to each user is decreased as more users (e.g. flows) contend for space in the shared area. Under the Fair Share Pool mechanism, packets belonging to a user (flow/port) are more likely to be dropped if the user exhausts their fair share of the shared area.

As shown in FIG. 3 and implemented in various embodiments, each of these mechanisms can be applied conjunctively to obtain a packet drop or packet accept decision. A Per-Flow mechanism 310 can be applied to an incoming packet 305 to yield a first accept or drop decision 312. Contemporaneously, a Global RED mechanism 320 can be applied to the same packet 305 to yield a second accept or drop decision 322. Also, contemporaneously with mechanisms 310 and 320, a Fair Share Pooled mechanism 330 can be applied to the same packet 305 to yield a third accept or drop decision 332.

The decisions 312, 322 and 332 are generated by indexing into the appropriate RED profile by the buffer occupancy (see formulae discussed below) to arrive at a probability of drop. This probability of drop can then be compared with a generated pseudo-random or random number. If the probability of drop is greater than the number generated then a packet drop decision is typically made, otherwise a packet accept decision is made.

Based on an identification of a flow associated with the packet 305, and where available, to which queue priority the packet 305 is assigned, a RED profile can be selected for each of the three schemes 310, 320 and 330. As discussed below, for a given flow or combination of flow and priority, different RED profiles may exist within the context of the same scheme. The decisions 312, 322 and 332 may be fed to a decision logic (such as an AND function) 340 to arrive at a final decision 350 whether to accept the packet into the buffer or drop the packet. In one embodiment of the invention, all three decisions 312, 322 and 332 must have a value of "accept" if the final decision 350 is to be "accept." In this latter embodiment, if any one of the decisions 312, 322 or 332 are a "drop", then packet 305 is dropped. A truth table for such an embodiment is shown below.

| Decision 312 | Decision 322 | Decision 332 | Final Decision 350 |
|---|---|---|---|
| accept | Accept | Accept | Accept |
| * | * | Drop | Drop |
| * | Drop | * | Drop |
| Drop | * | * | Drop |

Where * indicates a "don't care" condition such that the value could be either accept or drop.

In yet another embodiment, packet 305 can be accepted as long as at least one of the decisions 312, 322 and 332 yields an "accept." Thus, packet 305 would be dropped only if all three decisions 312, 322 and 332 yielded a drop decision. This embodiment is shown in the table below.

| Decision 312 | Decision 322 | Decision 332 | Final Decision 350 |
|---|---|---|---|
| Drop | Drop | Drop | Drop |
| * | * | Accept | Accept |
| * | Accept | * | Accept |
| accept | * | * | Accept |

Where * indicates a "don't care" condition such that the value could be either accept or drop.

Other embodiments may include a best of three rule, where any two drop or accept decisions obtained from decisions 312, 322 and 332 can yield a drop or accept at final decision 350, respectively. Alternatively, the decision logic 340 could be programmable such that the precise combination of decisions 312, 322 and 332 which yield a drop or add final decision 350 is case-based. In some embodiments of the invention, certain of the mechanisms may be disabled altogether so that the corresponding decision is neither generated nor considered in making an overall packet drop decision.

Figure 4:
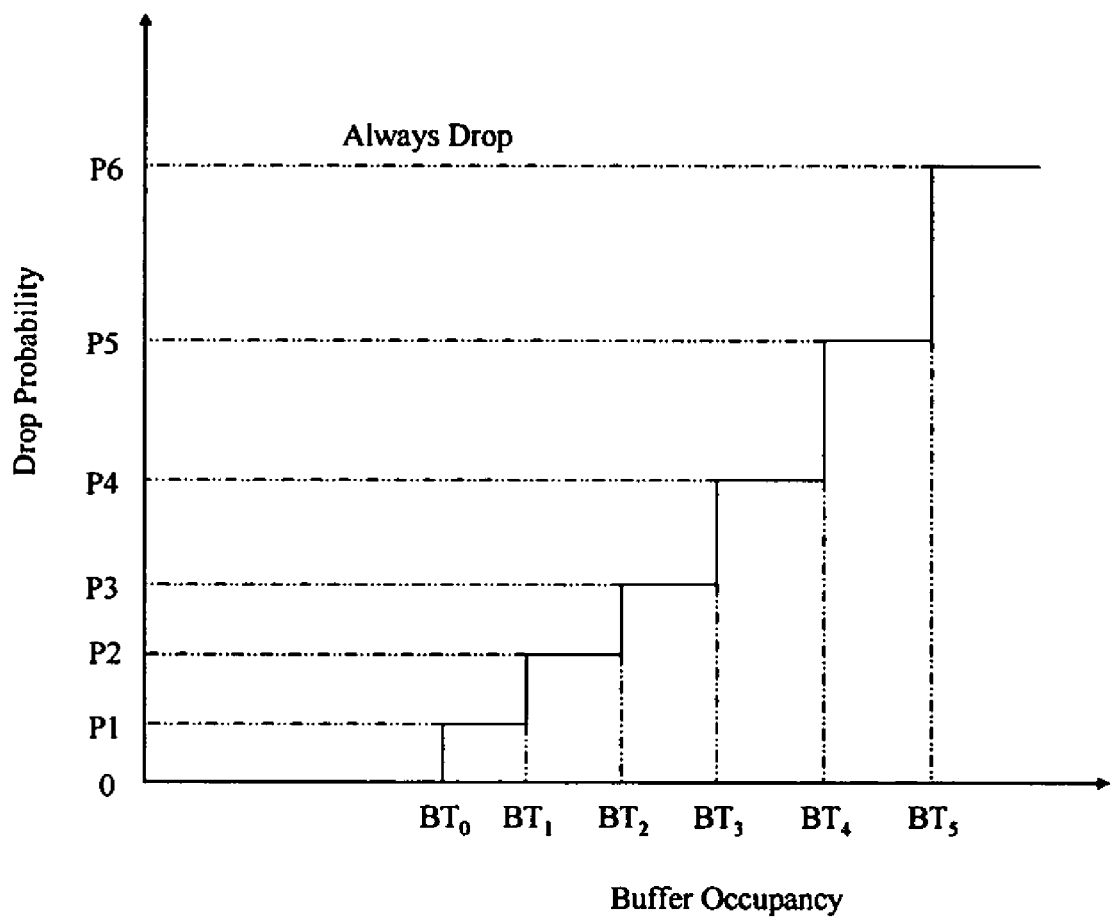
FIG. 4 illustrates a RED curve with discrete data points.

FIG. 4 illustrates a RED curve with discrete data points. The RED curve is often approximated using discrete data points as shown. For instance, six discrete data points, as shown, may be used to approximate what mathematically is a smooth exponential continuous curve. Weighted RED (WRED) uses different RED curves to provide different treatments for different flows. The indexing is a "buffer occupancy" indexing for both the Flow-based and Total Buffer schemes.

FIG. 4 shows six buffer occupancy levels BT0, BT1, BT2, BT3, BT4 and BT5, each pair of which define a range within which is returned corresponding drop probabilities P0, P1, P2, P3, P4 and P5, respectively. Thus, between an occupancy of BT0 to BT1, drop probability of P0 will be applied, between BT1 and BT2, P1 and so on. The drop probability of P5 could be an always drop (for instance P5=1.0), and occurs if occupancy is greater than or equal to BT5. If occupancy falls below the minimum threshold BT0, then the packet is never dropped (probability=0).

With this model, there are seven ranges of average buffer occupancy, each with a corresponding drop probability. This is illustrated in Table I below.

TABLE I

Buffer Occupancy and Drop Probability

| Buffer Occupancy (B) | Drop Probability |
|---|---|
| $B <= BT_0$ | 0 |
| $BT_0 < B <= BT_1$ | $P_0$ |
| $BT_1 < B <= BT_2$ | $P_1$ |
| $BT_2 < B <= BT_3$ | $P_2$ |
| $BT_3 < B <= BT_4$ | $P_3$ |
| $BT_4 < B <= BT_5$ | $P_4$ |
| $B > BT_5$ | $P_5$ |

One guideline for setting the RED "profile" or parameters is that the minimum threshold should be set high enough to prevent packets from being unnecessarily dropped and to prevent low utilizations. Yet another guideline is to ensure that the difference between the minimum and maximum thresholds BT0 and BT5 is large enough to avoid dropping many packets together in succession.

RED typically uses an exponentially weighted moving average (EWMA) of buffer occupancy as an index to the RED curve above. One relationship for determining the average buffer occupancy may be as follows:

$$B_A = B_A * W_A + B_I * (1 - W_A) \quad (2)$$

where $B_A$ is the average buffer occupancy, $W_A$ is the exponential weight for the moving average (a number between 0 and 1) and $B_I$ is the instantaneous buffer occupancy. The weight $W_A$ tracks how closely $B_A$ tracks $B_I$. The smaller the weight, the less dependent the average buffer occupancy ($B_A$) is on the instantaneous buffer occupancy ($B_I$). This in turn allows RED to ignore short term transients without inducing packet loss while reacting to sustained levels of occupancy. The average buffer occupancy can be made to equal the instantaneous buffer occupancy by setting $W_A$ equal to zero.

The definition of "buffer occupancy" in this context may vary for each of the three mechanisms described. For instance, in the Per-Flow mechanism, occupancy of the buffer could refer to the occupancy of the reserved block for the flow to which the packet belongs. Likewise, in the Global RED mechanism, the occupancy of the buffer may imply the entirety of the buffer, including shared and reserved buffer areas. For the Fair Share mechanism, the indexing of the RED curve may adopt a slightly different form as discussed below. The "average buffer occupancy" measure may also vary in terms of its relatedness to instantaneous buffer occupancy. Further, in accordance with some embodiments of the invention, the weight $W_A$ may be programmable.

Additionally, a unit measure of occupancy can be selected as appropriate for the particular system or architecture for which buffer management is being applied. For instance, in one implementation of the invention, buffer memory may be allocated in discrete chunks called Memory Allocation Units (MAUs). The size of the MAU determines the minimum size that a packet, or other data, will occupy in the buffer regardless of its original size. For instance, a packet of 128 bytes may be allocated the entire MAU space of 256 bytes even if each MAU in the system is 256 bytes. Packets of greater size than the MAU size can be allocated according to techniques such as chaining of memory. In accordance with one embodiment of the invention, the buffer management schemes could utilize the allocation/configuration of data in buffer memory rather than an original incoming packet size.

Per-Flow Weighted RED (PF-WRED)

Figure 5:
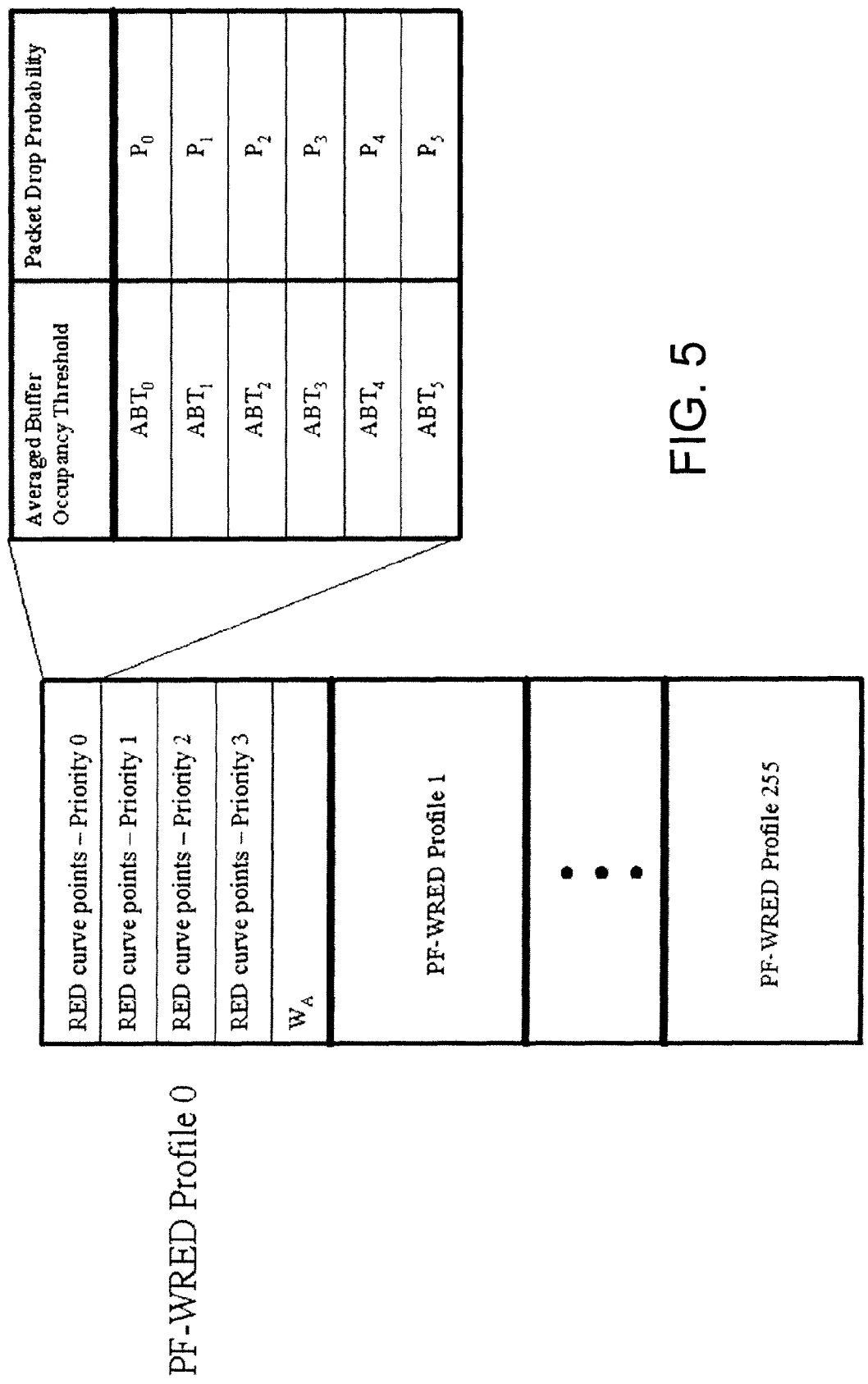
FIG. 5 shows at least one embodiment of the invention employing PF-WRED provides for 256 flows by including 256 user-definable configuration profiles.

A PF-WRED mechanism can be used to apply different RED treatments for each flow. The example depicted in FIG. 5 provides an embodiment of the invention employing PF-WRED provides for a plurality of flows by including 256 user-definable configuration profiles. Each of the flows may be assigned to one of these profiles and multiple flows may be assigned to each profile. Where multiple flows are assigned to a single profile, each of the multiple flows typically adopts identical characteristics as defined by the single profile. It will be appreciated that the number of profiles maintained in an embodiment is typically dependent on factors associated with the embodiment and thus may be a variable or fixed according to configuration and other factors.

Each PF-WRED profile typically has four sets of RED configuration parameters, one for each of the four priorities within user flows. The weighted nature of the PF-WRED mechanism stems from a capability to treat the four classes of packet within a flow differently for access to buffer space reserved for that flow.

In addition to the average buffer occupancy thresholds and associated drop probabilities that define the points of the RED curve for each of the priorities, the averaging weight parameter $W_A$ is specified within each of the profiles, as shown in FIG. 5.

PF-WRED typically uses average buffer occupancy as a per-flow measure. However, in the case of complete buffer partitioning and buffer reservation (see below) combined with a global fair share pool, the PF-WRED mechanism would preferably use the instantaneous flow buffer occupancy rather than average buffer occupancy. Instantaneous flow buffer occupancy is preferable because, in the case of complete buffer partitioning, instantaneous buffer occupancy could exceed the amount of reserved space if average buffer occupancy were used by the PF-WRED mechanism. Thus, in many embodiments, if the $W_A$ parameter in a PF-WRED profile is set to 0, then the PF-WRED mechanism will use instantaneous buffer occupancy for all flows mapped to that profile.

PF-WRED can be used to assign different RED drop probability curves to different priorities within that flow when a flow has reserved buffer space, so that packet loss probabilities of different classes within the flow can be differentiated. This capability in turn allows the network to support relative differentiation between the applications of end-users using only a single flow to implement private line services.

Figure 6:
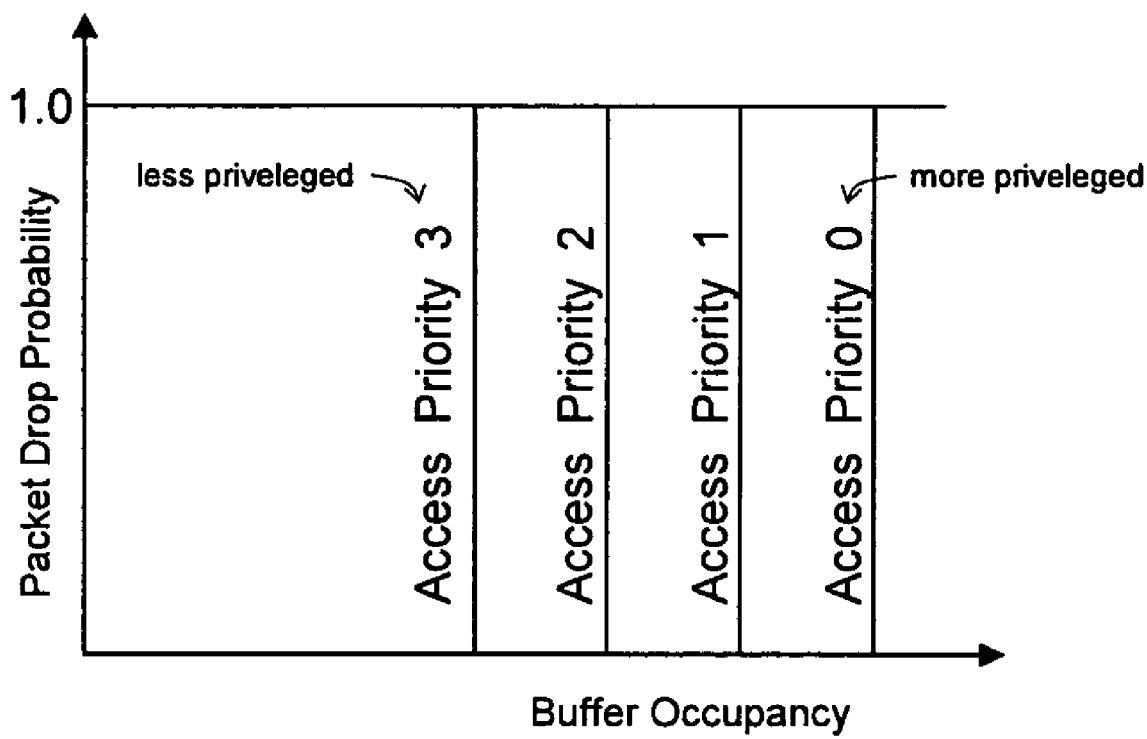
FIG. 6 shows how the RED configuration for different priorities can be set so as to create nested buffer access thresholds within the buffer space reserved for that flow.

For example, as shown in FIG. 6, the RED configuration for different priorities can be set so as to create nested buffer access thresholds within a buffer space reserved for that flow. With the exception of the highest buffer access priority, all priorities could be limited to a certain portion of the buffer space reserved for the flow. Packets with a highest buffer access priority would then have guaranteed available space within the reserved buffer space allocated to the associated flow and can be used to support applications that require minimum packet loss.

Global Fair Share Pool Weighted RED

Referring back to FIG. 2, in an example where Flow 1, Flow 3 and Flow 4 each have associated reserved blocks 211, 213 and 214 that are fully utilized or approaching full utilization, all three Flows ("users") could utilize the shared area 220 together. Under a non-weighted, even scheme, each would enjoy a one-third allocation of the shared area 220. Packets inbound for Flows 1, 3 or 4 would be accepted upon receipt provided the respective Flows were using less than their one-third allocated share. In alternate embodiments, the Fair Share mechanism can be weighted to favor one flow over other flows.

In accordance with aspects of the invention, the Fair Share mechanism may be a dynamic running scheme. Thus, if Flow 4 suddenly clears its reserved block 214 such that it no longer needs use of shared area 220, then the two remaining flows, Flow 1 and Flow 3, would become the only two users of the shared area 220. Thus, under a non-weighted even scheme, on average, Flow 1 and Flow 3 would each take half of the shared area 220. The dynamic nature of the mechanism accommodates changes in buffer conditions which changes may occur, for example, as a consequence of certain Flows being completed and traffic for new Flows being added to the shared area.

The invention enables the management of a common global pool of buffer space that is shared fairly between all flows using it. Fairness is typically expressed in terms of probability of access to the shared buffer space. In many embodiments Fair Share tracks the number of flows that concurrently use the shared buffer space. However, in some embodiments, fairness may not result in equal treatment of flows using the shared space. Each flow can also have a weight that determines its relative priority in accessing the shared buffer space.

If a flow is currently using more space than its reserved buffer space, it may considered to be using the common global fair share pool. To determine if a flow is currently using the shared buffer space, a reserved buffer threshold is typically assigned to each flow.

A packet arriving for a flow that has already depleted its reserved buffer space should see a drop probability that increases with the number of flows using the shared buffer and the amount of space that this flow may have already used in the shared buffer. Also, if differentiation between flows is desired, the packet drop probability may be adjusted according to the shared buffer usage weight assigned to the flow.

The above criteria for controlling access to the shared buffer space lends itself to the use of a RED approach, wherein a set of consecutive "effective" buffer occupancy ranges are associated with packet drop probabilities. The effective shared buffer occupancy for a particular flow is defined as:

$$B_{ES} = N_S \cdot B_{IS} \cdot W_S$$

$$B_{IS} = \begin{cases} 0 & \text{if } B_R > B_I \\ B_I - B_R & \text{otherwise} \end{cases}$$

where $B_{ES}$ is the flow's effective shared buffer occupancy, $B_{IS}$ denotes the flow's instantaneous shared buffer occupancy, $W_S$ is the shared buffer weight assigned to the flow, and $N_S$ is the number of flows that are currently using space in the shared buffer. Note that if no other flows are using the shared buffer, and if the flow in question is also currently using no space in the shared buffer, then the value of $N_S$ is zero. This means that $B_{ES}$ will be zero, and the drop probability of the packet for shared buffer access can also be zero.

$B_I$ is the instantaneous buffer occupancy of a flow including $B_{IS}$, the instantaneous shared buffer occupancy of the flow. $B_{IS}$ is the amount of buffer usage over the reserved buffer $B_R$ allocated to the flow. Average buffer occupancy—as used in PF-WRED—cannot be used for GFSP-WRED, because a flow's use or non-use of the shared buffer is determined based on instantaneous buffer occupancy. Note that even if the flow is not using the shared buffer space, the GFSP-RED may be applied without harm, since the effective shared buffer occupancy is zero in that case, and the associated drop probability for shared buffer access is correspondingly zero.

Figure 7:
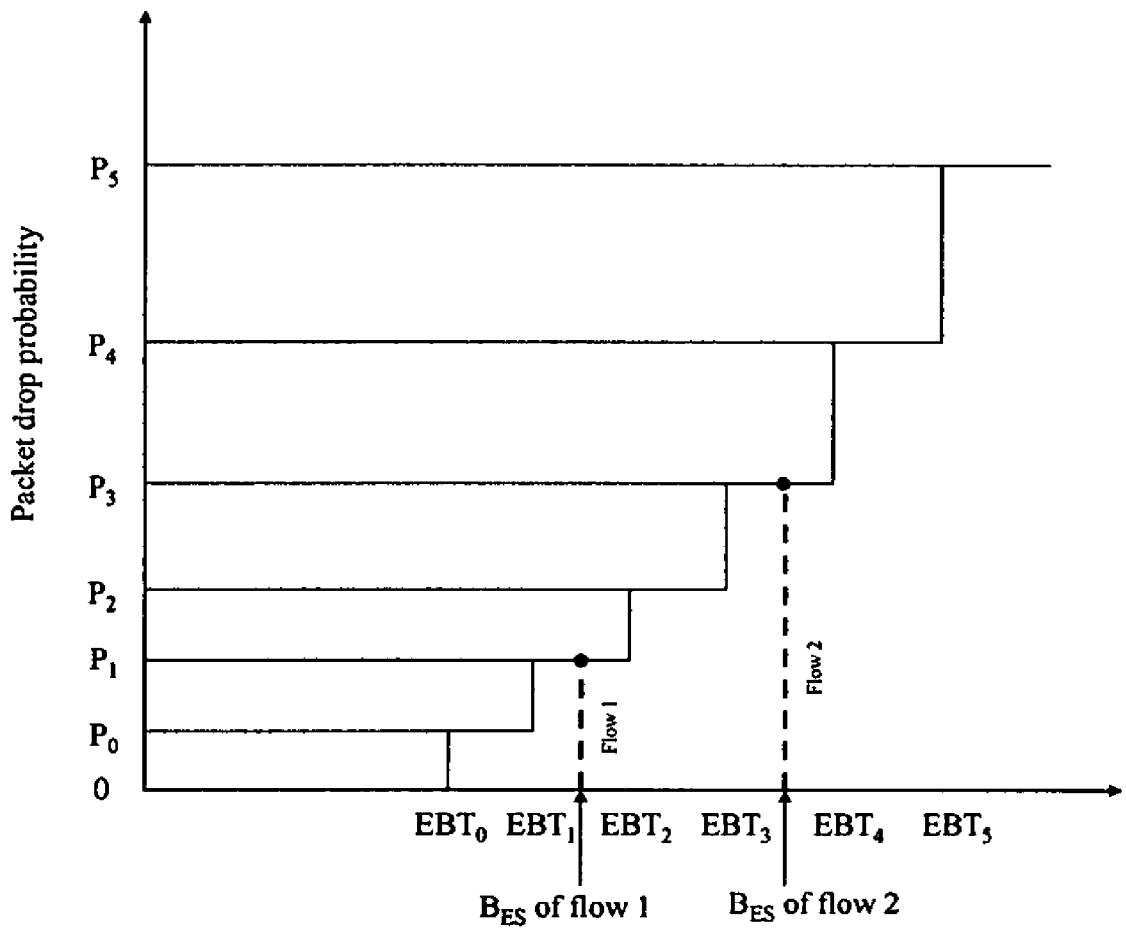
FIG. 7 shows two flows Flow 1 and Flow 2 using the same amount of space at a given point of time in the shared pool.

$W_S$ represents the shared buffer weight assigned to the flow. A lower value of WS indicates a more favored flow, with respect to use of the shared buffer space. For example, as shown in FIG. 7, consider that both Flow 1 and Flow 2 are using the same amount of space at a given point of time in the shared pool, but that Flow 2 has a larger weight. A packet arriving from Flow 2 at that time will typically see a higher drop probability than will an otherwise identical packet arriving from Flow 1.

Another way to visualize the GFSP-WRED mechanism without referring to the effective buffer occupancy is to imagine that the base RED curve shifts to the left when the number of active flows increase. The greater the number of active flows using the shared space, the more strict the GFSP-WRED mechanism becomes.

As shown in FIG. 8, the RED curve for the GFSP-WRED mechanism is specified with a set of effective shared buffer occupancy thresholds and corresponding packet drop probabilities. A single RED curve may be used by all flows. The per-flow configurable part of the GFSP-WRED mechanism includes the following two parameters:

$B_R$—the reserved buffer space for the occupancy threshold over which a flow can be considered to be using the global fair share pool; and $W_S$—the weight for the flow's use of the global fair share pool.

Global RED (G-RED)

In many embodiments, a Global RED (G-RED) mechanism is provided to ensure that global buffer occupancy is not exhausted. The G-RED typically uses one RED profile applied to total buffer usage and an associated RED curve may be indexed by the instantaneous total buffer usage (occupancy). When G-RED is applied, the total instantaneous buffer occupancy is typically used because G-RED may not always be used stand-alone. When total instantaneous buffer occupancy is used along with other RED mechanisms, G-RED's monitors check that the total buffer occupancy is not exceeded. This can be accomplished by, for example, having the G-RED parameters set such that the drop probability is 1.0 when total buffer occupancy reaches the total buffer size.

As shown in FIG. 9, the RED curve for G-RED implementation may be specified with a set of total instantaneous buffer occupancy thresholds and corresponding drop probabilities. Discussed below are different types of buffer sharing and partitioning schemes and how these can be implemented using the various buffer management mechanisms discussed above.

Complete Buffer Sharing

In embodiments providing complete buffer sharing, all flows typically have equal access to all of the buffer space. This means that an arriving packet should be dropped only if there is not enough buffer space to accommodate it. In some embodiments, this mode can be implemented in a system utilizing the buffer management mechanisms of the invention is to effectively turn off PF-WRED and GFSP-WRED mechanisms, and use the G-RED mechanism only. The PF-WRED mechanism cannot be used to implement a complete buffer sharing policy since it is based on each flow's buffer occupancy rather than the total buffer occupancy.

The PF-WRED mechanism can be effectively disabled by mapping all flows to a single PF-WRED profile, which configures to zero the drop probabilities for each of its four RED curves.

The GFSP-WRED mechanism can similarly be turned off, by one of three methods:

1) by setting all the drop probabilities in its RED curve to zero;

2) by setting the $W_S$ parameter to zero for all flows; and 3) by setting the $B_R$ parameter to the maximum buffer size for all flows.

For complete buffer sharing, the G-RED mechanism is preferably configured such that the packet drop probability is 1.0 when the space left in the buffer is less than what would be needed for a maximum-sized packet. The G-RED mechanism need not be configured so that its RED curve provides a simple tail drop mechanism. A tail drop mechanism is known in the art and, as implemented in embodiments of the invention, causes incoming packets to be dropped as buffer space is depleted. The G-RED mechanism typically uses instantaneous buffer occupancy rather than average buffer occupancy.

Complete Buffer Partitioning

A goal of complete buffer partitioning, is to provide each flow with its own reserved space in the buffer, such that flows do not share any buffer space at all. This partitioning scheme can be implemented using the PF-WRED mechanism, with instantaneous buffer occupancy. As in the complete buffer sharing mode, the GFSP-WRED mechanism is preferably configured such that it is effectively disabled.

One or more of different PF-WRED profiles can be used in this mode. Typically, all flows assigned to a PF-WRED profile must have the same amount of reserved buffer space. Using $B_R$ to represent a selected amount of reserved buffers, A PF-WRED profile with $B_R$ amount of reserved buffer space preferably configures its associated RED curves for all priorities such that the curves are either:

1) configured such that the packet drop probability reaches 1.0 when the flow's buffer occupancy is at $B_R$; or 2) configured such that the packet drop probability reaches 1.0 when the flow's buffer occupancy is at $B_R$-M, where M is the number of MAUs or amount of memory required to store a packet of the maximum size acceptable by the system.

If the PF-WRED mechanism is configured as in case (1), the G-RED mechanism should be set to perform tail drop when the remaining buffer space decreases to M or less. If PF-WRED is configured as in case (2), the G-RED mechanism can be disabled.

The $W_A$ parameter within all the PF-WRED profiles is preferably set to zero in complete buffer partitioning mode, to ensure that the PF-WRED mechanism uses instantaneous buffer occupancy. In complete buffer partitioning, the size of the reserved buffer space allocated to a flow must typically be at least as large as the maximum packet size allowed on that flow.

Partial Buffer Sharing

To implement partial buffer sharing, the PF-WRED mechanism can be used with average buffer occupancy. Typically in partial buffer sharing, it is not useful to have different RED curves for the different priorities within a flow because buffer space is not reserved for each flow. Therefore, each priority within a given PF-WRED profile is typically configured to be equal.

Different PF-WRED profiles may have different RED curves to provide differentiation among flows. The PF-WRED profiles can be configured to use average buffer occupancy. The GFSP-WRED mechanism is preferably configured such that it is effectively disabled in this mode (as in the complete sharing or complete partitioning). The G-RED mechanism can be configured for tail drop when the remaining buffer space is equal to or less than the amount required to store a packet of maximum acceptable size.

Fair Buffer Sharing

To implement fair buffer sharing, the PF-WRED mechanism is preferably configured such that it is effectively disabled, as is done for complete buffer sharing. The $B_R$ parameter in all the flows should typically be set to 0, so that all flows are considered to be using the global fair share pool.

The G-RED mechanism is preferably configured to perform tail drop when the remaining buffer space is equal to or less than the amount required to store a packet of maximum acceptable size.

Per Flow Buffer Reservation with Global Fair Share Pool

If buffer space is reserved for some flows and a global fair share pool (GFSP) is also implemented, then any one of the following three conditions may be true for a given flow:

Case 1) The flow has reserved buffer space but is not allowed to use the fair share pool.

Case 2) The flow has reserved buffer space and is also allowed to use the fair share pool.

Case 3) The flow has no reserved buffer space, and uses the fair share pool only.

For a flow intended to use reserved buffer space only (case 1), the PF-WRED profile assigned to that flow is preferably configured to drop packets when the buffer occupancy of that flow reaches the reserved space less the amount of memory required to store a packet of maximum acceptable size. The flow's $B_R$ parameter can be set to the amount of its reserved space. This will typically ensure that the flow will not be considered as one that uses the fair share pool.

For a flow intended to use both a reserved buffer space and the fair share pool (case 2), the PF-WRED profile assigned to that flow is preferably configured to prevent packet dropping. The $B_R$ parameter for this flow is preferably set to the amount of its reserved buffer space.

For a flow intended to use the fair share pool only, the PF-WRED profile assigned to that flow is preferably configured to prevent packet dropping. The $B_R$ parameter for this flow is preferably set zero so that the flow is always considered to be using the fair share pool.

In implementing per-flow buffer reservation with GFSP, the G-RED mechanism is preferably configured for tail drop when remaining buffer space is equal to or less than the amount required to store a packet of maximum acceptable size. If flows have no reserved buffer space, then the size of the shared buffer must be at least as large as the maximum system packet size limit.

Although the present invention has been particularly described with reference to embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A method for managing resources in a network device, comprising:
   allocating a portion of shared storage to each of a plurality of data flows based on a current number of data flows sharing the shared storage;
   reserving a portion of the shared storage as a reserved buffer for a certain one of the plurality of data flows, the reserved buffer being maintained separately from the shared storage, wherein the shared storage is also used as overflow space for the reserved buffer when the reserved buffer is fully occupied;
   obtaining a plurality of contemporaneously calculated probability metrics indicating whether an arriving data unit associated with the certain one of the plurality of data flows can be stored in the network device, wherein the plurality of probability metrics includes:
     a global fair share (GFS) probability based on factors including the size of the allocated portions of shared storage and the current number of data flows; and
     a probability based on the occupancy of the reserved buffer, and
   discarding selected data units based on the plurality of contemporaneously calculated probability metrics and other factors including configuration of the network device.

2. The method according to claim 1, further comprising:
   when the total number of data flows changes,
     reallocating the shared storage among the plurality of data flows; and
     updating one or more of the plurality of probability metrics to accommodate the change in the total number of data flows.

3. The method according to claim 1, wherein the plurality of probability metrics further include a Global Random Early Detection (G-RED) probability based on factors including total occupancies of both the shared storage and the reserved buffer.

4. The method according to claim 1, further comprising assigning priorities to each data unit in the certain one data flow.

5. The method according to claim 4, wherein the plurality of probability metrics further include a Per-Flow Weighted Random Early Detection (PF-WRED) probability based on factors including occupancy of the reserved buffer and the assigned priorities.

6. The method according to claim 5, wherein the PF-WRED factors include an instantaneous buffer occupancy.

7. The method according to claim 5, wherein the PF-WRED factors include a weighted average of previous buffer occupancies.

8. The method according to claim 7, wherein weighting is selected according to flow and assigned priorities.

9. The method according to claim 5, wherein the plurality of probability metrics include a G-RED probability.

10. The method according to claim 1, wherein the GFS probability factors include occupancy of the shared storage.

11. The method according to claim 1, wherein the GFS probability factors include availability of buffers other than the shared storage.

12. The method according to claim 1, wherein the GFS probability factors include a measure of effective shared storage occupancy representative of instantaneous shared storage occupancy of a flow associated with the arriving data unit.

13. The method according to claim 12, wherein the instantaneous shared buffer occupancy is adjusted using one or more weighting factors, and at least one of the weighting factors is related to the number of flows using the shared storage.

14. The method according to claim 13, wherein the one or more weighting factors include at least one factor configurable by a user.

15. The method according to claim 13, wherein the one or more weighting factors include a factor indicative of availability of other buffers for storing data units, and wherein the other buffers include the reserved buffer.

16. The method according to claim 15, wherein adjustment of the instantaneous shared storage occupancy is based on available buffers including the shared storage and the other buffers.

17. The method according to claim 15, wherein the one or more weighting factors are selected according to flow.

18. A system for managing resources in a network device comprising:
a plurality of data sources, each data source providing a data flow;
a plurality of reserved buffers allocated from a common storage and dedicated for the use of certain data flows;
shared buffers allocated from the common storage, wherein the shared buffer is used for storing data units associated with each of the data flows and as overflow space for the reserved buffer when the reserved buffer is fully occupied;
a Global Fair Share Pool Weighted Random Early Detection (GFSP-WRED) processor for generating a GFSP-WRED probability; and
a processor for receiving arriving data units, wherein the processor discards certain of the arriving data units and stores others of the arriving data units, wherein the certain data units are selected based on factors including the GFSP-WRED probability, wherein the GFSP-WRED processor adjusts a share of the shared buffers allocated to each of the data sources responsive to a change in the number of data sources in the plurality of data sources.

19. The system of claim 18, further comprising a Global Random Early Detection (G-RED) processor for generating a G-RED probability, wherein the factors for selecting the certain data units include the G-RED probability.

20. The system of claim 18, further comprising a Per Flow Weighted Random Early Detection (PF-WRED) processor for generating a PF-WRED probability, wherein the factors for selecting the certain data units include the PF-WRED probability.

21. The system of claim 18, wherein the certain data units are selected based on factors including G-RED and PF-WRED probabilities calculated contemporaneously with the GFSP-WRED probability.

22. The system of claim 1, wherein a service level of the certain one data flow is guaranteed.

23. The system of claim 2, wherein the plurality of data flows includes the certain one data flow when the reserved buffer is fully occupied.

24. A method for managing resources in a network device, comprising:
reserving a first buffer in the network device for a high priority data flow;
sharing a second buffer in the network device among a plurality of data flows that includes the high priority data flow;
for a packet of the selected data flow arriving at the network device, contemporaneously
calculating, in the network device, a per-flow random early detection (RED) probability based on occupancy of the first buffer
calculating, in the network device, a global RED probability based on occupancy of the first and second buffers, and
calculating, in the network device, a global fair-share RED probability based on occupancy characteristics of the second buffer; and
determining if the arriving packet will be discarded based on the per-flow, the global and the global fair-share RED probabilities.

25. The method of claim 24, further comprising for each of the calculated RED probabilities, generating a decision whether the arriving packet should be dropped, wherein the the action of generating the decision includes comparing the decisions.

26. The method of claim 25, wherein the packet is discarded when any of the decision is a drop decision.

27. The method of claim 25, wherein the packet is discarded when all of a plurality of decisions from the action of generating the decision are drop decisions.

28. The method of claim 25, wherein the packet is discarded when a majority of a plurality of decisions from action of generating the decision are drop decisions.

29. The method of claim 24, further comprising:
when a new high priority data flow is added to the plurality of data flows, reserving a third buffer for the new data flow; and
reallocating the second buffer among the among the plurality of data flows.

30. The method of claim 24 further comprising, when a high priority data flow is dropped from the plurality of data flows, reallocating the second buffer among the among the plurality of data flows.

* * * * *